M. C. FRINS.
UNIVERSAL JOINT.
APPLICATION FILED DEC. 6, 1920.

1,403,856.

Patented Jan. 17, 1922.
2 SHEETS—SHEET 1.

Inventor
Maximilian C. Frins
By Attorneys

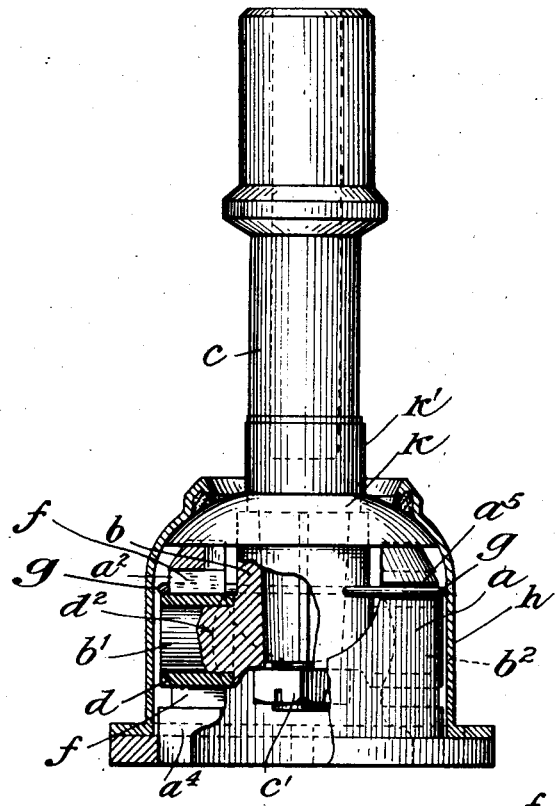
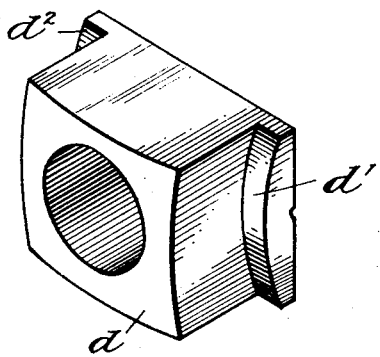
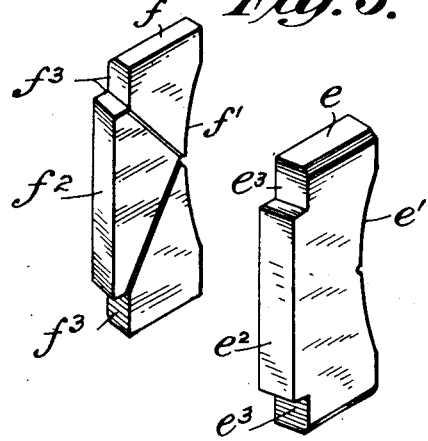

UNITED STATES PATENT OFFICE.

MAXIMILIAN C. FRINS, OF NEW YORK, N. Y., ASSIGNOR TO INTERNATIONAL MOTOR COMPANY, OF NEW YORK, N. Y., A CORPORATION OF DELAWARE.

UNIVERSAL JOINT.

1,403,856.   Specification of Letters Patent.   Patented Jan. 17, 1922.

Application filed December 6, 1920. Serial No. 428,464.

*To all whom it may concern:*

Be it known that I, MAXIMILIAN C. FRINS, a citizen of the United States, residing in the borough of Manhattan of the city of New York, in the State of New York, have invented certain new and useful Improvements in Universal Joints, of which the following is a specification, reference being had to the accompanying drawings, forming a part hereof.

This invention relates to an improved universal joint of a mechanical type involving the use of trunnions, which is characterized by simplicity of construction, fewness of parts, strength, large superficial wearing surfaces, adequate lubrication and generally increased efficiency. Joints of this type most commonly in use employ opposed trunnions disposed in planes at right angles to afford capacity for universal movement. To unite the parts it has been necessary to employ a relatively great number of nuts, washers and other mechanical units, all of which are subject to wear and dislodgment and require constant lubrication and replacement. In accordance with the present invention only one pair of trunnions is employed and provision for angular movement of the connected shafts in the plane of these trunnions is made by mounting the trunnion block with capacity for planetary movement about the axis of the trunnion member. This construction not only has the advantage of eliminating one pair of trunnions and a great number of associated parts therefor but in providing a large superficial bearing surface for the movable trunnion block with consequent decrease in wear on said bearing. Further, the improved joint being characterized by fewness of parts is further characterized by ease of assembling and disassembling. The connected elements are so constructed and arranged as to be movable into position by very simple manipulations where they are locked against withdrawal by strong locking units. Subordinate improvements relate to the oil retainer and the means for readily assembling it in its relation to the cover for the joint. Details of the construction will appear in connection with the description of the illustrated embodiment shown in the drawings, wherein—

Figure 3 is a view of the joint shown in Figure 1 and displaced through an angle of 90°, parts of one of the trunnions and its block being broken away in the interest of clearness.

Figure 4 is a view in perspective of one of the trunnion blocks.

Figure 5 is a view in perspective showing the two sides of the shoes on which the trunnion block rocks.

Figure 1:
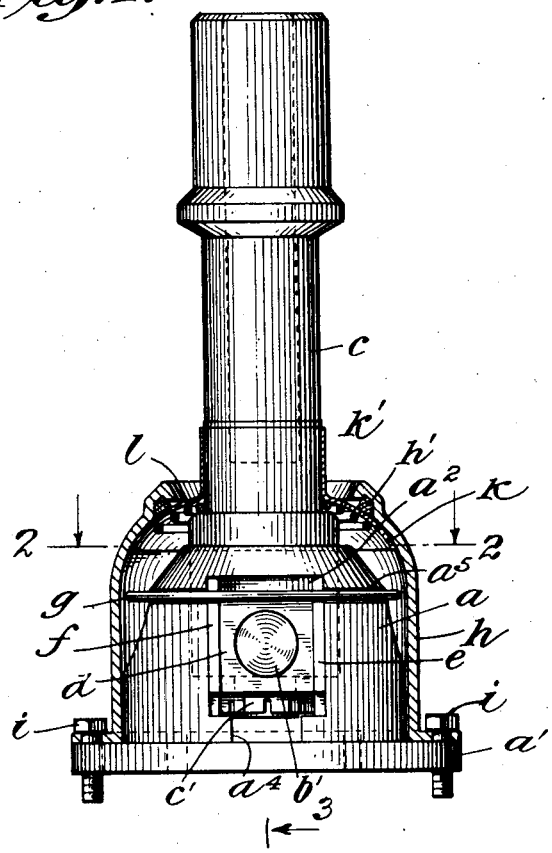
Figure 1 is a view showing the improved joint in assembled relation to one of the ends of one of the shafts associated therewith, the cover for the joint and the oil retainer being shown in section to expose the joint.
Figure 2:
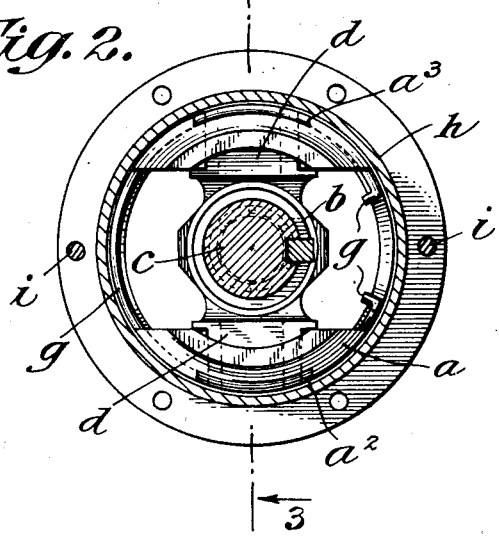
Figure 2 is a view in transverse section through the joint and its cover, and taken along the plane indicated by the line 2—2 of Figure 1 and looking in the direction of the arrows.

The improved joint includes a generally cylindrical housing $a$, which may have somewhat the form of a truncated cone and be formed integral with an annular flange $a'$ for connection to a driving or driven member. The housing $a$ is slotted longitudinally at diametric points, as indicated at $a^2$, $a^3$, these slots being relatively constricted at the ends nearer to the flange $a'$, as indicated for the slot $a^2$ at $a^4$. Into the housing $a$ may be passed the trunnion member $b$ having oppositely extending trunnions $b'$, $b^2$, the width of the constricted portions of the slots $a^2$, $a^3$ being such as to permit the trunnions to be passed through them, one of the constricted portions being indicated at $a^4$. The trunnion member $b$ may be slidably or fixed united with the associated shaft section $c$, the invention not being limited to the character of the connection between the trunnion member and the shaft section, although, as shown in Figure 3, the shaft section $c$ has its end tapered and splined and the member $b$ is fixed thereon by means of a retaining nut $c'$ threaded on to the end of the shaft. For each of the trunnions $b'$, $b^2$, there is provided a trunnion block, one of which is shown at $d$. Each of the blocks $d$ is bored to receive the respective trunnions $b'$, $b^2$, and permit their rotary movement for angular movement of the connected shafts in one plane. Since the blocks $d$ are identical and their relation to other parts in the different slots $a^2$, $a^3$, the same, it will be sufficient for the purpose of this application to continue the description with reference only to the block $d$ in the slot $a^2$.

The block $d$ is of less length than the slot $a^2$ and of less width and may or may not be of greater width than the constricted portion $a^4$. On opposite sides of the block $d$ there are formed curved bearing shoulders $d'$, $d^2$, these shoulders being of such width, as to bring the overall width of this portion of the block $d$ to such dimensions as to insure clearance of the block within the slot $a^2$. The bearing surfaces $d'$, $d^2$, are formed symmetrically about the point of intersection of the axis of the trunnions $b'$, $b^2$ and the axis of the trunnion member $b$. Between the opposite sides of the block $d$ and the walls of the slot $a^2$ are placed shoes $e$, $f$, which are of such width as to fill the spaces between the sides of the block and the walls of the slots leaving a running fit. The shoes are curved along one edge, as at $e'$, $f'$, concentrically with the respective curved shoulders $d'$, $d^2$, and afford bearing surfaces of relatively large superficial area for planetary movement of the blocks thereon about a point on the axis of the trunnion member $b$. The outer edges of the shoes $e$, $f$, are preferably chamfered, as at $e^2$, $f^2$, to conform generally to the curvature of the cover $h$, so that the shoes when in place will lie substantially flush with the surface of said cover. The shoes are also preferably shouldered along the edges $e^2$, $f^2$, as at $e^3$, $f^3$, respectively, for co-operation with a shoe retainer spring, illustrated as an open ended wire spring $g$ encircling the housing $a$ and resting within a retaining groove $a^5$ formed on the surface of the housing and lying over the shouldered portions $e^3$, $f^3$ of the shoes $e$, $f$.

The oil cover $h$ hereinafter described with reference to its housing function has a very important mechanical function in that it resists the radial movement of the shoes $e$, $f$ under the stress of end thrust of the associated shafts $c$, etc. Under such end thrust, it is evident that when the trunnion member $b$ moves with its trunnions $b'$, $b^2$, the associated blocks $d$ will tend to move and force the shoes $e$, $f$ outwardly in a radial direction with respect to the axis of the trunnion member. In such radial movement the shoes engage the inner face of the cover $h$, so this cover must be formed of such strength and in such relation to the shoes as to hold them against movement. The cover $h$ is struck about the axis of the trunnion member $b$ and is formed at one end with a hemispherical portion concentric with the point about which the blocks $d$ have their planetary movement. In the same way, the spherical retainer $k$ is struck about said point.

The co-operating oil retainer devices for the improved joint are of simple and satisfactory construction, being both inexpensive to manufacture, easy to assemble and disassemble and effective in use to maintain an oiltight covering, excluding dust and retaining the lubricant. A cover $h$ which may be formed generally as a cylinder with a hemispherical end, or of any other shape, constitutes one element of the oil retainer means and may be bolted to the flange $a'$, as by means of bolts $i$. The co-operating element is formed as a hemispherical retainer $k$ carried with a sleeve $k'$ which has a snug sliding engagement with the shaft section $c$. The inner end of the trunnion member $b$ will form a convenient seat for a spiral spring $l$ which may bear under tension against the inner face of the retainer $k$. A packing $h'$ may be mounted in the cover $h$ and co-operate with the exterior face of the retainer $k$ to form a dustproof and oiltight engagement. In assembling the cover $h$ and retainer $k$ it will be understood that the cover is backed off the joint along the shaft $c$. The spring $l$ is attached on its seat afforded by the end of the trunnion member $b$. The retainer $k$ at this time is also backed away from the joint along the shaft $c$. The retainer is then moved towards the joint compressing the spring $l$ and indeed causing its coils to assume an involute relation. The cover $h$ is then slid in place and secured by means of the bolts $i$ thereby holding the retainer $k$ against movement under the influence of the spring $l$.

In operation the shaft sections will have angular movement in one plane about the trunnions $b'$, $b^2$, journaled in blocks such as $d$. These blocks will be held against movement by the walls of the slots $o^2$, $a^3$, and the action of the respective pairs of shoes $e$, $f$, which rest between the walls of the respective blocks $d$ and the respective slots, and act somewhat like shims. However, angular movement of the connected shafts in the plane of the trunnions $b'$, $b^2$ is afforded by rotary movement of the trunnion blocks, such as $d$, through their shoulders $d'$, $d^2$, on the curved bearing edges $e'$, $f'$ of the shoes $e$, $f$.

Lubrication of the entire structure is very complete; all wearing surfaces have the greatest possible superficial area, and the fewness of parts with provision for great angular movement insures a joint of maximum efficiency.

I claim as my invention.

1. A universal joint comprising a housing slotted at diametrically opposite points, a trunnion member within the housing having trunnions resting within the slots, trunnion blocks in the slots and in which the trunnions are journaled, said blocks being formed with bearing surfaces, curved about the axis of the trunnion member and in planes generally transverse thereto, and shoes on which the blocks are supported interposed between the sides of the blocks and the walls of the slots and having bearing surfaces co-operating with the bearing surfaces on said blocks to afford planetary movement of the blocks about the axis of the trunnion member.

2. A universal joint comprising a housing slotted at diametrically opposite points, a trunnion member within the housing and having oppositely extending trunnions resting within the slots, trunnion blocks within the slots and within which said trunnions are journaled, respectively, said trunnion blocks being formed with shoulders on opposite faces curved about the axis of the trunning member and in planes generally transverse thereto, shoes on which the blocks are supported, interposed between said opposite faces of each block and the proximate side wall of each slot and each having a curved bearing surface engaging a curved bearing shoulder, and means to retain said shoes against dislodgment.

3. A universal joint comprising a housing slotted at diametrically opposite points, the slots being constricted at their inner ends, a trunnion member having oppositely extending trunnions of less diameter than the said constricted slots, trunnion blocks of greater width than the said constricted slots resting within the wider portions of said slots and in which said trunnions are journaled, and bearing shoes for said blocks interposed between the opposite faces thereof and the side walls of the slots to afford planetary movement of said blocks about the axis of the trunnion member.

4. A universal joint comprising a circular housing slotted at diametrically opposite points, a trunnion member within the housing and having opposed trunnions resting in the said slots, trunnion blocks in the slots and in which said trunnions are journaled, each block being formed with bearing surfaces at opposite sides of the trunnion, said bearing surfaces being formed symmetrically about a point of intersection of the axis of said trunnion and the axis of the trunnion member, and bearing shoes on which the blocks are supported having bearing surfaces formed symmetrically about the same center, said shoes being interposed between the faces of the blocks and the side walls of the slots, respectively, the bearing surfaces of the blocks resting movably on the bearing surfaces of the shoes for planetary movement of the blocks about the axis of the trunnion member.

5. A universal joint including a housing formed with an annular flange, a trunnion member within the housing, a spring seated on the end of the trunnion member, a hollow retainer of spherical form engaging the spring and a cover curved similarly to the retainer and lying over its outer surface, and means to secure the cover to said flange.

6. A universal joint comprising a housing slotted at diametrically opposite points, a trunnion member having trunnions to rest in the slots, trunnion blocks within the slots and in which the trunnions are journaled, means to support the trunnion blocks with capacity for planetary movement about the axis of the trunnion member, and a cover enclosing the housing and maintaining such supporting means against radial movement with relation to the axis of the trunnion member.

This specification signed this 30 day of November, A. D. 1920.

MAXIMILIAN C. FRINS.